A. RYDER.
COUPLINGS FOR TRAIN TELEGRAPHS.
No. 176,069. Patented April 11, 1876.
—Fig. 1—
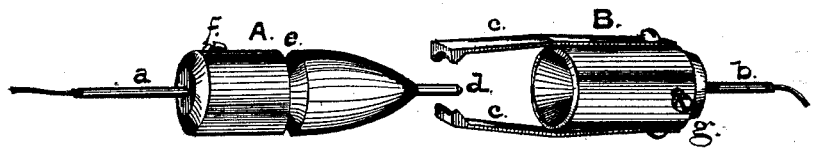
—Fig. 2—
Witnesses: Inventor.

UNITED STATES PATENT OFFICE.

ANDREW RYDER, OF OAKLAND, CALIFORNIA.

IMPROVEMENT IN COUPLINGS FOR TRAIN-TELEGRAPHS.

Specification forming part of Letters Patent No. 176,069, dated April 11, 1876; application filed February 15, 1876.

*To all whom it may concern:*

Be it known that I, ANDREW RYDER, of Oakland, State of California, have invented an Improvement in Electric Couplings for Train-Telegraphs, of which the following is a specification:

My invention relates to an improvement in the couplings used to connect the ends of electric bell cords or wires in a railway-train, and to conduct the currents from one car to the other. It consists in the use of a male and female coupling of peculiar construction, so that they connect or unite the ends of the wires, respectively, secured to them when they are brought together, and thus transmit the current, the female coupling being provided with a suitable fastening that secures the two parts together, as will hereinafter more fully appear.

Figure 1 of the accompanying drawings shows the ends and adjacent platforms of two carriages in a train, and the arrangement of the positive and negative wires of the telegraph between them. Fig. 2 is a perspective view, full size, of the two parts of the coupling.

The male portion of the coupling A, Fig. 2, is made of conical shape at the front end, and has a projecting pin, $d$, at its point in line with its axis. At the center of its length there is a circular groove, $e$, and back of this groove the coupling takes the form of a cylinder. The wire or electric conductor $a$ is let into a hole provided for it in the end of the cylinder, and is secured by a set-screw, $f$. The other part of the coupling is shown at B. It is composed of a cylinder, with a conical recess in one end corresponding in shape with the male part A, and with a hole at the bottom of the recess running through in line with the axis and to the opposite end of the cylinder. Within this hole the other wire $b$ is introduced and held by a screw, $g$. Upon the outside of this cylinder B are secured two metallic and elastic jaws, $c c$, whose ends are bent up and made with a circular edge or of such form that they shall properly engage with and embrace the part of the cylinder behind the shoulder formed by the groove $e$. These parts thus constructed are in perfect electric contact with each other when they are brought together. The head of the male coupling A fits into the recess in the other part B, and the pin $d$ enters the hole at the bottom of the recess, while the two are firmly held together by the spring-jaws $c c$, so that the weight of the parts, or the oscillations of the wires when the train is in motion, has no effect upon the coupling to separate or strain the parts.

The form of the jaws $c c$ may be varied without departing from the principle or scope of my invention. They may be broader than is shown, and shaped to extend around the cylinder, or the cylinder and jaws may be formed in one piece; but I prefer the construction herein shown as being mechanically superior, as the jaws may be replaced whenever they become bent or injured.

Fig. 1 illustrates the arrangement of the wires and couplings between two carriages of a train, the cable being separated, or the two separate wires, if such are used, being led out through the opening C above the door, and the wires carried, one to the right and the other to the left, under the roof, so that they may not touch in their oscillations.

The wires that conduct the one current are shown as connected together by the coupling A, while the other coupling is disconnected, and the part B of the other current is shown as hanging down from the hook beneath the roof.

In operating this invention to give a signal the parts are easily separated to give a signal and as quickly connected again. They also give a signal automatically when the train separates from accident.

Having thus fully described my invention, what I claim is—

An electric coupling for train-telegraphs, consisting of a male coupling, A, secured to one wire, and a female coupling, B, secured to the other, the former one having a conical or contracted head, and a projecting nose or pin, $d$, adapted to enter a recess in the end of the female coupling, and this latter one, B, having jaws $c c$, or equivalent fastenings of an elastic nature, to engage with the said male part A, and hold the two together, both constructed and operating substantially as herein set forth.

Witness my hand and seal this 25th day of January, 1876.

ANDREW RYDER. [L. S.]

In presence of—
  WALTER BLAIR,
  WM. R. BUTLER.